(12) United States Patent
Yang et al.

(10) Patent No.: US 8,726,753 B2
(45) Date of Patent: May 20, 2014

(54) ANTI-BACKLASH GEAR AND TRANSMISSION MECHANISM USING THE SAME

(75) Inventors: Xin Yang, Shenzhen (CN); Wei Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 274 days.

(21) Appl. No.: 13/244,662

(22) Filed: Sep. 25, 2011

(65) Prior Publication Data
US 2012/0073395 A1  Mar. 29, 2012

(30) Foreign Application Priority Data
Sep. 29, 2010 (CN) .......................... 2010 1 0296905

(51) Int. Cl.
*F16H 55/16* (2006.01)
*F16H 55/18* (2006.01)

(52) U.S. Cl.
CPC ................ *F16H 55/16* (2013.01); *F16H 55/18* (2013.01)
USPC .............................................. 74/461; 74/409

(58) Field of Classification Search
CPC ................................. F16H 55/16; F16H 55/18
USPC .................... 74/409, 415, 425, 440, 461, 464
See application file for complete search history.

(56) References Cited

U.S. PATENT DOCUMENTS

| 782,628 A | * | 2/1905 | Taylor | 74/461 |
| 874,342 A | * | 12/1907 | Janson | 74/464 |
| 4,833,934 A | * | 5/1989 | Boyko et al. | 74/425 |

FOREIGN PATENT DOCUMENTS

JP  3-223560  * 10/1991

* cited by examiner

*Primary Examiner* — William C Joyce
(74) *Attorney, Agent, or Firm* — Novak Druce Connolly Bove + Quigg LLP

(57) ABSTRACT

A gear includes an outer ring, an inner ring, gear teeth, and elastic members engaged with the gear teeth. The outer ring defines a number of first fixing holes. The inner ring and the outer ring are concentric, and the inner ring defines a number of second fixing holes respectively corresponding to the first fixing holes, and each pair of first and second fixings hole align with the center of the rings, and define an axis of movement for spring loaded gear teeth.

15 Claims, 3 Drawing Sheets

ANTI-BACKLASH GEAR AND TRANSMISSION MECHANISM USING THE SAME

BACKGROUND

1. Field of the Disclosure

The present disclosure generally relates to drive systems, and particularly to an anti-backlash gear and a transmission mechanism using the same.

2. Description of Related Art

A conventional transmission mechanism usually includes an input shaft and an output shaft connected by a plurality of gears of different sizes, such that the input shaft and the output shaft can rotate at different speeds.

The gears often have toothed cylindrical bodies, and the main body of each cylindrical body defines a connecting hole receiving a shaft, including the input shaft or the output shaft. The teeth of one gear are configured to mesh with teeth of another gear.

However, in use, backlash and friction generated between gears can often cause teeth to break, which will damage the transmission mechanism.

What is needed, therefore, is a transmission mechanism which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will be made to the drawings to describe preferred and exemplary embodiments in detail.

Figure 1:
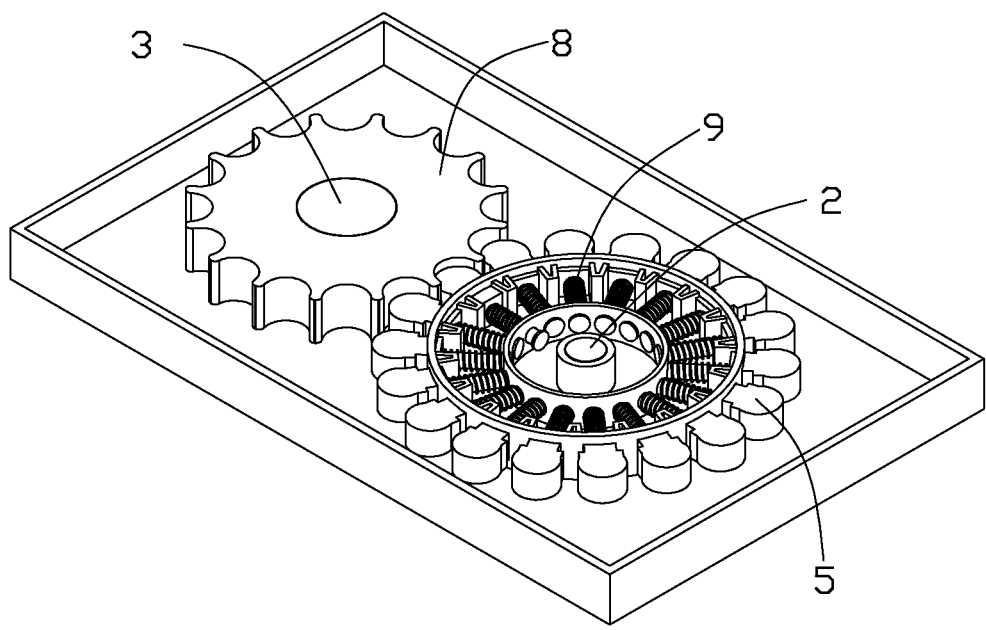
FIG. 1 is an assembled, isometric view of a transmission mechanism according to an exemplary embodiment of the present disclosure.
Figure 2:
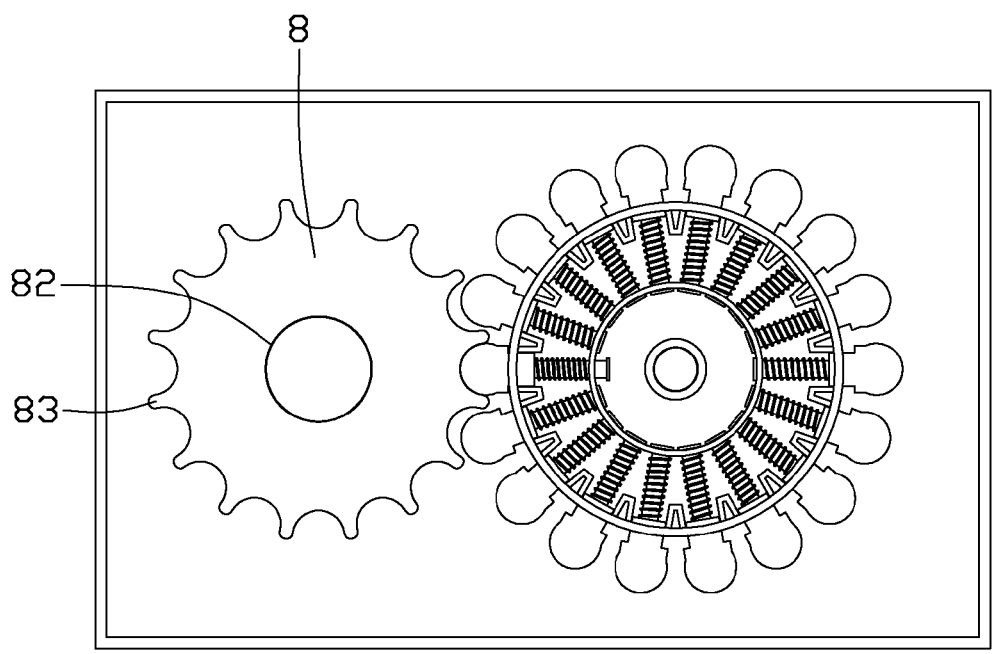
FIG. 2 is bottom plan view of the transmission mechanism of FIG. 1.
Figure 3:
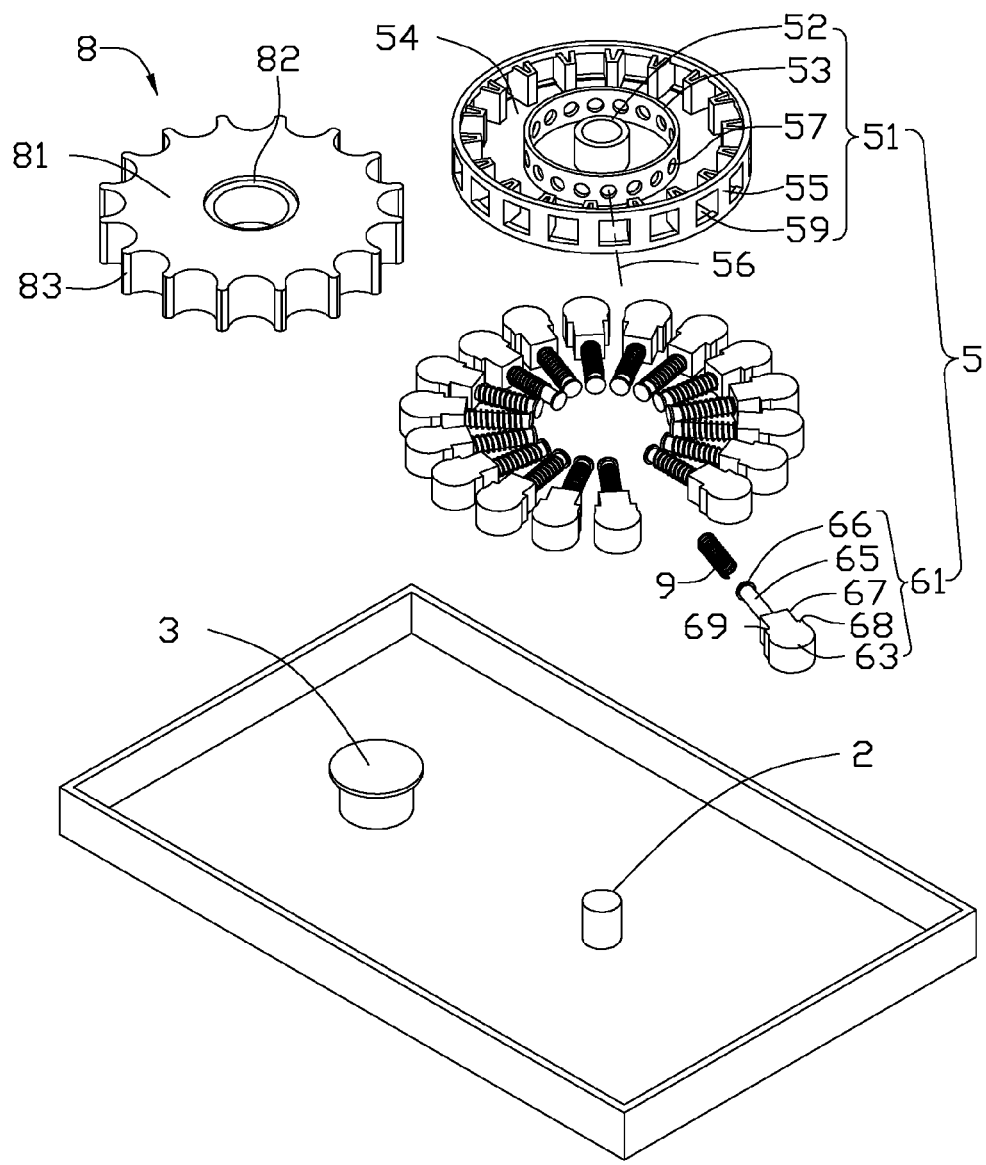
FIG. 3 is an exploded, isometric view of the transmission mechanism of FIG. 1.

Referring to FIGS. 1 through 3, an embodiment of a transmission mechanism 1 includes a transmission shaft 2, a first gear 5, a second gear 8, and a pivot shaft 3. Teeth of the first gear 5 are spring-loaded to allow radial movement of the teeth during use so as not to break by backlash forces when meshed with other teeth. The first gear 5 is sleeved on the transmission shaft 2, and the second gear 8 is sleeved on the pivot shaft 3. The second gear 8 meshes with the first gear 5.

The first gear 5 includes a first main body 51, a plurality of first gear teeth 61 each being partly received in the first main body 51, and a plurality of elastic members 9. The first main body 51 includes a circular bottom board 54, an outer ring 55 upwardly extending from an edge of the circular bottom board 54, an inner ring 53 inside the outer ring 55 and upwardly extending from the circular bottom board 54, and a sleeve 52. The sleeve defines a first connecting hole (not labeled) in the center to accommodate the transmission shaft. The outer ring 55, the inner ring 53, and the sleeve 52 are concentric rings. The outer ring 55 defines a plurality of first fixing holes 59 in its peripheral surface. The inner ring 53 defines a plurality of second fixing holes 57 in its peripheral surface, the second fixing holes 57 corresponding to the respective first fixing holes 59. Each first fixing hole 59, the corresponding one of the second fixing holes 57, and the center of the rings are in alignment, thereby defining an axis 56 of movement between the two corresponding fixing holes 59 and 57 along which teeth can move. The first fixing holes 59 and the second fixing holes 57 are shaped to ensure the first gear teeth 61 move only along the axis and do not escape the rings.

Each first gear tooth 61 is partly inserted into a pair of first and second fixing holes 59 and 57, and is movable along the axis 56. Each first gear tooth 61 includes an engaging portion 63, a first limiting member 66, a sliding protrusion 67, and a sliding post 65. The engaging portions 63 are configured for meshing with the second gear 8. Each engaging portion 63 includes a semi-circular (other shapes are acceptable in alternate embodiment) meshing surface and a stopper surface 69 having a greater area than that of the first fixing hole 59. The sliding protrusion 67 extends from rear of the engaging portion 63, and connects between the engaging portion 63 and the sliding post 65. The sliding post 65 integrally extends from the sliding protrusion 67. A cross-sectional area of the sliding protrusion 67 is greater than that of the sliding post 65, thereby defining a stepped-structure. The cross-sectional area of the sliding protrusion 67 is substantially equal to or less than the area of the first fixing hole 59. The cross-sectional area of the sliding post 65 is substantially equal to or less than the area of the second fixing hole 57. At the end of the sliding post 65, the first limiting member 66 is detachably arranged and a sectional area of the first limiting member 66 is greater than that of the second fixing hole 57. In the embodiment, each engaging portion 63 further includes a second limiting member 68 serving as a connecting portion of the engaging portion 63 for connecting the sliding protrusion 67. A surface of the second limiting member 68 from where the sliding protrusion 67 extends has a greater area than the first fixing hole 59, so that the surface serves as the stopper surface 69 of the engaging portion 63.

In assembly of the first gear 5, the elastic member 9 is sleeved on the sliding post 65 of the corresponding one of the first gear teeth 61. The sliding protrusion 67 and the sliding post 65 of each first gear tooth 61 extend through the first fixing hole 59 and the second fixing hole 57, respectively, with the elastic member 9 limited between the outer ring 55 and the inner ring 53. The end of the sliding post 65 passes through the second fixing hole 57 and is located inside the inner ring 53. The first limiting member 66 is fixed to the end of the sliding post 65, thereby preventing the first gear tooth 61 from escaping from the first main body 51.

The second gear 8 includes a second main body 81 and a plurality of second gear teeth 83 extending from a rim of the second main body 81. The second main body 81 defines a second connecting hole 82 in the center to accommodating the pivot shaft 3. The second gear teeth 83 mesh with the engaging portion 63 of the first gear 5.

In assembly of the transmission mechanism 1, the first gear 5 is sleeved on the transmission shaft 2, and the second gear 8 is sleeved on the pivot shaft 3, the second teeth 83 of the second gear 8 mesh with the engaging portion 63 of the first gear 5.

Referring also to FIG. 1 again, in use, the transmission shaft 2 can be connected to other components, and the pivot shaft 3 can be connected to other components too. When the transmission shaft 2 rotates, the first gear 5 is driven to rotate by the transmission shaft 2, and rotates the second gear 8. When the first gear tooth 61 is in a free state, the elastic member 9 has a smallest resilient force, two ends of the elastic member 9 respectively abut against an outer surface of the inner ring 53 and the sliding protrusion 67, and the elastic member 9 keeps at least a part of the sliding protrusion 67 extending out of the outer ring 55. When the first gear tooth 61 engages the second gear tooth 83 imperfectly, the top tooth 63 of the first gear tooth 61 is then pressed by a meshing force between the first and second gears 5 and 8. The sliding protrusion 67 and the sliding post 64 of the first gear tooth 61 move toward the center of the outer ring 55 along the axis 56 until the stopper surface 69 of the second limiting member 68 of the engaging portion 63 abuts against the outer ring 55. The elastic member 9 is compressed during such movement, and provides a resilience force to the first gear tooth 61. When the first gear tooth 61 disengages from the second gear tooth 83, the sliding protrusion 67 and the sliding post 64 of the first gear tooth 61 rebound along the axis 56.

When the first and second gears 5, 8 are in use, each first gear tooth 61 can move along the axis 56, and the elastic member 9 can elastically deform and rebound during the movement of the first gear tooth 61. Thereby, the elastic member 9 can absorb much or most of backlash force acted between the first and second gears 5 and 8. Thus, the first and second gear teeth 61 and 83 are protected from being damaged, and the reliability of the transmission mechanism 1 is improved.

The transmission mechanism 1 herein is not limited to the above-described embodiments. For example, in alternative embodiments, the second gear can be a internal gear, the second gear has a ring profile, the teeth are arranged on the inner surface of the ring profile, and the first gear are located inside the second gear. In another example, the second gear can be a rail with teeth thereon.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A gear, comprising:
   an outer ring defining a plurality of first fixing holes in its periphery;
   an inner ring concentric with the outer ring, and defining a plurality of second fixing holes in its periphery, the second fixing holes corresponding to the first fixing holes, wherein each first fixing hole, the corresponding one of the second fixing holes, and the center of the rings are in alignment, and defining an axis of radial movement between the pair of the first and second fixing holes;
   a plurality of gear teeth; and
   a plurality of elastic member sleeved on the respective gear teeth;
   wherein each gear tooth extends through a pair of corresponding first and second fixing holes, and being movable along the axis defined by the first and second fixing holes, each gear tooth comprises an engaging portion located outside the outer ring, the engaging portion comprises a meshing surface and a stopper surface having a size greater than the first fixing hole; each elastic member is configured to deform and rebound during the movement of the corresponding gear tooth so as to absorb shock generated by the gear.

2. The gear of claim 1, wherein a sliding protrusion extending from the engaging portion and a sliding post extending from the sliding protrusion, the first fixing hole corresponds to the sliding protrusion and the second fixing hole corresponds to the sliding post such that the sliding protrusion can be received in the first fixing hole, and the sliding post can be received in the second fixing hole with an end of the sliding post being received in the inner ring.

3. The gear of claim 2, wherein each elastic member is sleeved on the sliding post and limited between the outer ring and the inner ring.

4. The gear of claim 3, wherein each gear tooth further comprises a first limiting member detachably arranged on the end of the sliding post to prevent the end of the sliding post from escaping from the inner ring.

5. The gear of claim 4, wherein the engaging portion further comprises a second limiting member serving as a connecting portion for connecting the sliding protrusion, and a surface of the second limiting member from where the sliding protrusion extends has a size greater than the first fixing hole such that surface of the second limiting member serves as a stopper surface of the engaging portion.

6. The gear of claim 5, wherein when the gear tooth is in a free state, the elastic member has a small resilient force, two ends of the elastic member respectively abut against the inner ring and the sliding protrusion, and the elastic member keeps at least a part of the sliding protrusion extending out of the outer ring, and when the gear tooth engages with another gear, the sliding protrusion and the sliding post move toward the center of the outer ring along the axis defined by the first and second fixing holes until the stopper surface of the engaging portion abuts against the outer ring, the elastic member is compressed during such movement, and provides a resilience force to the gear tooth, and when the gear tooth disengages from the another gear, the sliding protrusion and the sliding post of the gear tooth are driven to move away from the center of the outer ring along the axis by the resilience force of the elastic member.

7. The gear of claim 1, further comprising a bottom board, the outer ring upwardly extending from the bottom board, and the inner ring located in the outer ring and upwardly extending from the circular bottom board.

8. A transmission mechanism, comprising:
   a first gear, comprising:
      an outer ring defining a plurality of first fixing holes in its periphery;
      an inner ring concentric with the outer ring, and defining a plurality of second fixing holes in its periphery, the second fixing holes corresponding to the first fixing holes, wherein each first fixing hole, the corresponding one of the second fixing holes, and the center of the rings are in alignment, and defining an axis of radial movement between the pair of the first and second fixing holes;
      a plurality of first gear teeth; and
      a plurality of elastic member sleeved on the respective gear teeth; and
   a second gear with a plurality of second gear teeth meshed with the first gear;
   wherein each first gear tooth extends through a pair of corresponding first and second fixing holes, and being movable along the axis defined by the pair of the first and second fixing holes, each first gear tooth of the first gear comprises an engaging portion located outside the outer ring, the engaging portion comprises a meshing surface and a stopper surface having a size greater than the first fixing hole; each elastic member is configured to deform and rebound during the movement of the corresponding first gear tooth so as to absorb the shock generated by the first and second gears.

9. The transmission mechanism of claim 8, wherein a sliding protrusion extending from the engaging portion and a sliding post extending from the sliding protrusion, the first fixing hole corresponds to the sliding protrusion and the second fixing hole corresponds to the sliding post such that the sliding protrusion can be received in the first fixing hole, and the sliding post can be received in the second fixing hole with an end of the sliding post being received in the inner ring.

10. The transmission mechanism of claim 9, wherein each elastic member is sleeved on the sliding post and limited between the outer ring and the inner ring.

11. The transmission mechanism of claim 10, wherein each first gear tooth further comprises a first limiting member detachably arranged on the end of the sliding post to prevent the end of the sliding post from escaping from the inner ring.

12. The transmission mechanism of claim 10, wherein the engaging portion further comprises a second limiting member serving as a connecting portion for connecting the sliding protrusion, and a surface of the second limiting member from where the sliding protrusion extends has a size greater than the first fixing hole such that surface of the second limiting member serves as a stopper surface of the engaging portion.

13. The transmission mechanism of claim 12, wherein when the first gear tooth of the first gear is in a free state, the elastic member has a small resilient force, two ends of the elastic member respectively abut against the inner ring and the sliding protrusion, and the elastic member keeps at least a part of the sliding protrusion extending out of the outer ring, and when the first gear tooth engages the second gear tooth imperfectly, the top tooth is pressed by a meshing force between the first and second gears, the sliding protrusion and the sliding post move toward the center of the outer ring along the axis defined by the first and second fixing holes until the stopper surface of the top tooth abuts against the outer ring, the elastic member is compressed during such movement, and provides a resilience force to the gear tooth, and when the first gear tooth disengages from the second gear tooth, the sliding protrusion and the sliding post of the gear tooth are driven to move away from the center of the outer ring along the axis by the resilience force of the elastic member.

14. The transmission mechanism of claim 13, wherein the first gear further comprising a bottom board, the outer ring upwardly extending from the circular bottom board, and the inner ring located in the outer ring and upwardly extending from the bottom board.

15. The transmission mechanism of claim 8, further comprising a transmission shaft and a pivot shaft, the first gear is sleeved on the transmission shaft, and the second gear is sleeved on the pivot shaft.

\* \* \* \* \*